United States Patent [19]

Brown

[11] Patent Number: 5,592,071

[45] Date of Patent: Jan. 7, 1997

[54] METHOD AND APPARATUS FOR SELF-REGENERATION SYNCHRONOUS REGULATOR

[75] Inventor: Alan E. Brown, Georgetown, Tex.

[73] Assignee: Dell USA, L.P., Austin, Tex.

[21] Appl. No.: 371,322

[22] Filed: Jan. 11, 1995

[51] Int. Cl.⁶ .................................................. G05F 1/56
[52] U.S. Cl. ........................... 323/282; 323/224; 323/287
[58] Field of Search ..................................... 323/222, 223, 323/224, 282, 283, 284, 285, 286, 287

[56] References Cited

U.S. PATENT DOCUMENTS

| | | | |
|---|---|---|---|
| 3,626,277 | 12/1971 | Munson | 323/287 X |
| 4,132,925 | 1/1979 | Schmutzer et al. | 323/287 X |
| 4,585,988 | 4/1986 | Nakai | 323/285 |
| 5,485,076 | 1/1996 | Schoenwald et al. | 323/224 X |

*Primary Examiner*—Peter S. Wong
*Assistant Examiner*—Y. J. Han
*Attorney, Agent, or Firm*—Henry N. Garrana; Mark P. Kahler; Michelle M. Turner

[57] ABSTRACT

A synchronous regulator circuit including a transformer having a secondary inductor magnetically coupled to a primary inductor, where the secondary inductor is coupled to control a synchronous power switch. The secondary inductor operates to drive the synchronous power switch using self-regeneration during a flux reversal phase of each cycle. A timing circuit or simple pulse width modulation circuit (PWM) turns on the primary switch and turns off the synchronous switch during a power phase of each cycle, and then turns off the primary switch during the flux reversal phase of each cycle. The flux reversal of the secondary inductor drives the synchronous switch on, thereby achieving synchronous operation without an expensive dual output PWM. The present invention is illustrated using both a buck and a boost topology. A third switch is preferably used to clamp the synchronous switch off during the power phase.

24 Claims, 2 Drawing Sheets

METHOD AND APPARATUS FOR SELF-REGENERATION SYNCHRONOUS REGULATOR

FIELD OF THE INVENTION

The present invention relates to a power supply for driving an electronic load, and more particularly to synchronous regulator circuits using a self-regeneration drive method.

DESCRIPTION OF THE RELATED ART

DC to DC regulators are generally used to convert an unregulated DC voltage to a regulated DC voltage. Such regulators are widely used in switch mode DC power supplies for generating the appropriate DC voltage signals on the system board and option cards of a computer system. The two must common types of DC to DC regulator topologies include buck and boost topologies. In both buck and boost topologies, an oscillator type circuit such as a pulse width modulator turns on and off a primary power switch driving current from an unregulated source voltage through a choke inductor or transformer to develop an output voltage. In the buck regulator circuit, when the primary switch is turned on, the source voltage is coupled to the load through the inductor and when the primary switch is turned off, the load current flows through a free-wheeling rectifier or diode. The buck regulator is commonly used to step-down the voltage of the unregulated source. In a boost regulator circuit, the primary switch is turned on to apply power to an inductor or transformer for storing energy and is turned off to release the stored energy to the output circuit and load.

Synchronous DC to DC regulation is often used to improve the efficiency and performance of DC to DC converters by reducing losses in the power switches or diodes. In general, two switches must be synchronized so that one switch is turned on while the second is off, and vice versa. In particular, a primary switch is turned on while the second switch is turned off during a first half of each cycle to provide power, and then the primary switch is turned off and the synchronous switch is turned on during the second half of the cycle to free-wheel load current or to otherwise release stored energy to the output. Generally, the standard method of achieving an active switch instead of a passive diode in low voltage, high current DC to DC regulators is to use a power metal oxide-semiconductor field-effect transistor (MOSFET). Typically, dual synchronous MOSFETs are driven by a dedicated pulse width modulated (PWM) integrated circuit (IC) having dual synchronized outputs. However, typical PWM ICs having a dual drive capability for driving synchronous switches are relatively expensive.

It is desired to achieve the benefits of synchronous DC to DC regulation and to eliminate the need of the relatively expensive PWMs having dual drive outputs.

SUMMARY OF THE PRESENT INVENTION

A synchronous regulator using a self-regeneration method according to the present invention eliminates the dual drive requirement thereby allowing the use of relatively inexpensive, single output timing circuits. In this manner, a relatively inexpensive off-the-shelf component, such as the NE555 timer, is used rather than a costly dual output PWM IC. In general, the primary switching device is coupled through a primary inductor or coil of a transformer and the synchronous switch is controlled by a secondary inductor magnetically coupled to the primary inductor. A timing circuit or simple PWM turns on the primary switch and turns off the synchronous switch during the first half of each cycle to transfer power to the output in a buck regulator or otherwise to store energy within the transformer in a boost regulator. The timing circuit switches to initiate the second half of the power cycle by turning off the primary switch causing flux reversal of the primary and secondary inductors, where such flux reversal of the secondary inductor turns on the synchronous switch. In this manner, the natural circuit action of flux reversal through the transformer eliminates the need for a second, synchronous output of the PWM and eliminates the problem of cross conduction between the primary and synchronous switching elements. The switching elements are preferably MOSFETs to achieve low power dissipation as compared to a passive device such as a diode.

In the preferred embodiment, a feedback path is provided from the output to the timing circuit or PWM to provide stable voltage regulation. The feedback path preferably includes a voltage divider providing a feedback signal to the feedback or modulation input of the timing circuit or PWM. If a timing circuit is used, an error amplifier or shunt regulator is preferably included to complete the feedback loop.

In a buck regulator circuit according to the present invention, a timer is used to drive the gate of a primary switch MOSFET. The current path of the primary switch is coupled between the input DC voltage and the primary inductor of the transformer. The timer also drives the gate of a switch element, which is further coupled to the synchronous switch to assure that the synchronous switch is turned off during the power conduction cycle. The current path of the synchronous switch is connected to the primary inductor and its control terminal is coupled to the secondary inductor of the transformer. In this manner, when the output of the timer goes low, the primary switch is turned off and the synchronous switch is turned on through flux reversal of the secondary winding, and the synchronous switch provides a path for free-wheel current through the load. In the preferred embodiment, a third MOSFET is included to clamp the synchronous switch off during the power phase of each cycle.

In a boost regulator circuit according to the present invention, a relatively inexpensive PWM with a single output is used to drive two switching elements for further activating the primary power and synchronous switches. In general, the PWM turns on a primary switch for allowing current to flow through the primary inductor of a switching transformer for storing energy. The PWM then switches off the primary switch causing flux reversal of a secondary inductor, which turns on a synchronous switch to provide a current path to the output for transferring stored energy. A third MOSFET is preferably included to clamp the synchronous switch off. Similar to that of the buck converter, separate small signal or double-diffused MOSFETS are also preferably included to control switching action.

In either of the disclosed preferred embodiments, synchronous DC to DC regulation is achieved without the use of a relatively expensive dual drive output PWM IC.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
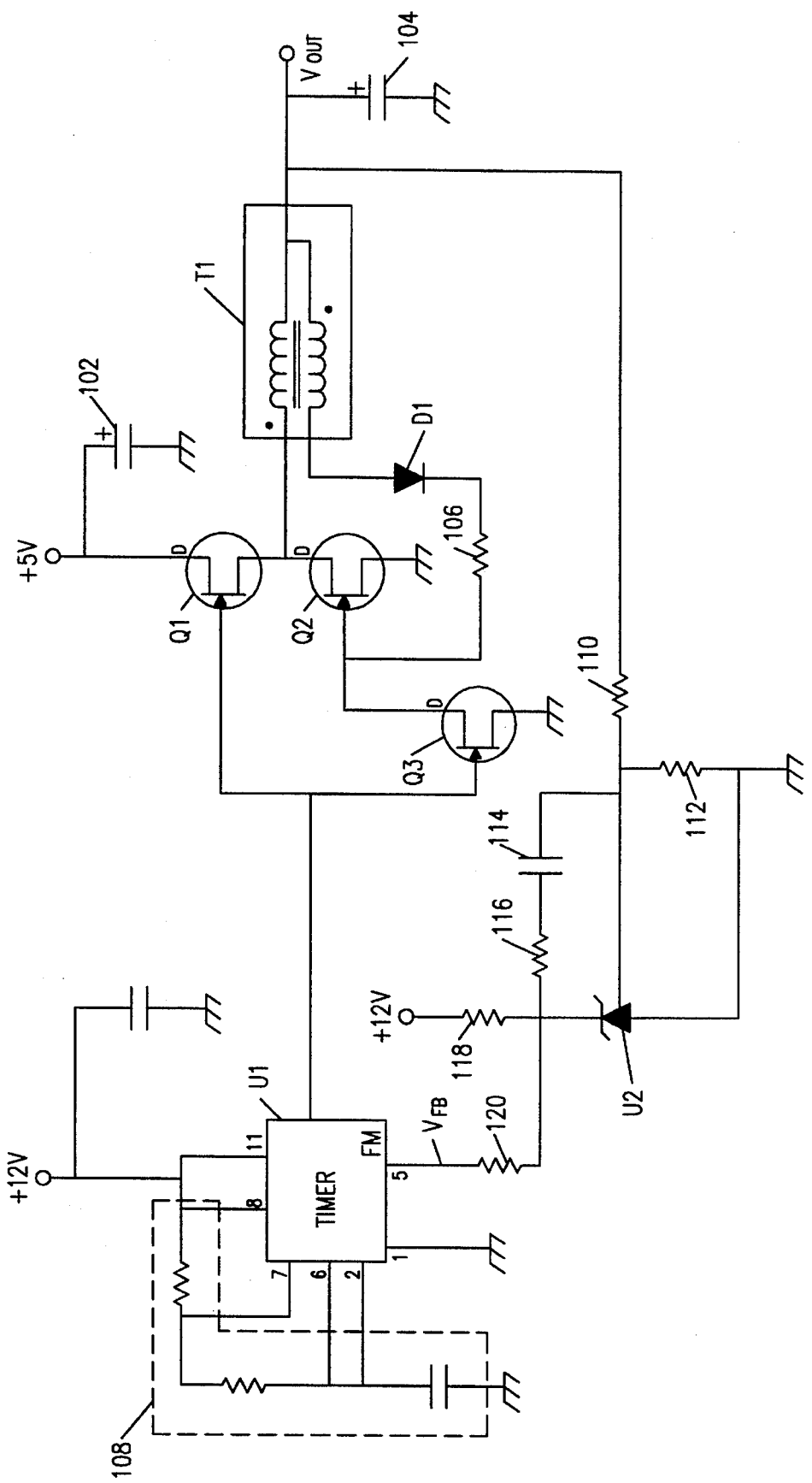
FIG. 1 is a schematic diagram of a buck regulator circuit according to the present invention.

Referring now to FIG. 1, a schematic diagram is shown of a buck regulator circuit 100 implemented according to the present invention. In general, a buck regulator performs step down DC to DC voltage conversion to provide a regulated operating voltage for system boards or planars and option cards. The source voltage is preferably the 5 volt output signal from an AC to DC converter, which is referred to as the +5 V signal. A filter capacitor 102 is coupled between the +5 V signal and ground, which is typically chassis ground, and the +5 V signal is also provided to the drain of an n-channel enhancement type metal-oxide-semiconductor field-effect transistor (MOSFET) Q1. The source of MOSFET Q1 is connected to the drain of another n-channel enhancement type MOSFET Q2, having its source connected to ground. The MOSFETs Q1, Q2 are both preferably the MTP50N05EL, although any suitable power MOSFET would suffice. The source of the MOSFET Q1 is also connected to the dotted terminal of the primary inductor of a transformer T, where the undotted terminal of the primary inductor provides the regulated output voltage, referred to as $V_{OUT}$. A secondary inductor of the transformer T has its dotted terminal connected to the undotted terminal of the primary inductor. $V_{OUT}$ is preferably regulated at approximately 3.75 volts and is filtered by a filter capacitor 104 coupled between $V_{OUT}$ and ground.

The undotted terminal of the secondary inductor of the transformer T is connected to the anode of a diode D1, having its cathode connected to one end of a resistor 106. The other end of the resistor 106 is connected to the gate of the MOSFET Q2 and also to the drain of an n-channel double-diffused MOSFET Q3, which is preferably the 2N7000, although any suitable small signal MOSFET or comparable switching device would suffice. The source of the MOSFET Q3 is connected to ground and the gates of the MOSFETs Q1, Q3 receive a PWM signal from a timer circuit U1, which is preferably implemented using an NE555 type timer. The NE555 is a bipolar device, which is preferred for increased drive capability in the range of 100–200 milliamps (ma) as compared to a CMOS device. The timer U1 is coupled to a resistive-capacitive (RC) timing circuit 108 which receives a 12 volt source voltage referred to as +12 V, where the timing circuit 108 preferably establishes the nominal operating frequency of the buck regulator 100, which is typically about 100 KHZ. The timer U1 also has an input referred to as FM which receives a feedback signal $V_{FB}$ for modifying the duty cycle of the PWM signal to regulate the voltage level of $V_{OUT}$ in a manner more fully described below.

$V_{OUT}$ is provided to one end of the feedback resistor 110 having its other end connected to one end of a resistor 112, which has its other end connected to ground. The junction between the resistors 110 and 112 is connected to one end of a network compensation capacitor 114 and to the reference input of a shunt regulator U2, having its anode connected to ground. The other end of the capacitor 114 is connected to one end of a resistor 116, having its other end connected to the cathode of the shunt regulator U2 and to one end of a resistor 118. The other end of the resistor 118 receives the +12 V signal. The cathode of the shunt regulator U2 is also provided to one end of a resistor 120, which has its other end providing the $V_{FB}$ signal and connected to the FM input of the timer U1.

Operation of the buck regulator circuit 100 is as follows. The timer U1 asserts the PWM signal as a square wave having a duty cycle substantially controlled by the feedback signal $V_{FB}$ provided to its FM input. When the PWM signal is asserted high, the MOSFETs Q1, Q3 are turned on so that the +5 V input signal charges the tank circuit formed by the primary inductor of the transformer T and the capacitor 104. The MOSFET Q3 clamps the gate of MOSFET Q2 to ground thereby shutting it off When the PWM signal is asserted low by the timer U1, the MOSFETs Q1, Q3 are turned off causing a flux reversal of the primary and secondary inductors of the transformer T, where the secondary inductor forward biases the diode D1 and drives the gate of the MOSFET Q2 high via the diode D1 and the resistor 106. The MOSFET Q2 thus turns on and conducts, effectively providing a free-wheeling circuit through the diode D1, the current path MOSFET Q2 and $V_{out}$. When the PWM signal is next asserted high, the MOSFETs Q1 and Q3 again conduct thereby shutting the MOSFET Q2 off and turning on the MOSFET Q1 as described previously.

It is seen that the flux reversal of the transformer T causing voltage reversal of the secondary inductor is used to drive or otherwise turn on the MOSFET Q2 through natural circuit action, which also eliminates or otherwise substantially reduces cross-conduction between the MOSFETs Q1 and Q2. Therefore, a separate PWM output signal is not required to drive the MOSFET Q2. The present invention allows the use of relatively inexpensive components, such as the NE555 timer, double-diffused MOSFETS and supporting components.

The resistors 110, 112 form a voltage divider of $V_{OUT}$ which is provided to the reference input of the shunt regulator U2. The reference input of the shunt regulator U2 is compared to an internal reference voltage, which is preferably about 2.5 volts. In this manner, the shunt regulator U2 is preferably operated in the linear mode to maintain its external reference input at approximately 2.5 volts, thereby maintaining $V_{OUT}$ at approximately 3.75 volts. The timer U1 and the shunt regulator U2 and supporting circuitry combined with the implementation of a secondary inductor are less expensive than a sophisticated PWM IC normally used for synchronous DC to DC converters. The diode D1 is optional, but is preferred in the event of possible ringing of the transformer T1 during flux reversal, which could cause the MOSFET Q2 to oscillate on and off. The diode D1 effectively isolates the MOSFET Q2, so that it remains on during flux reversal in spite of any ringing of the transformer T1.

Figure 2:
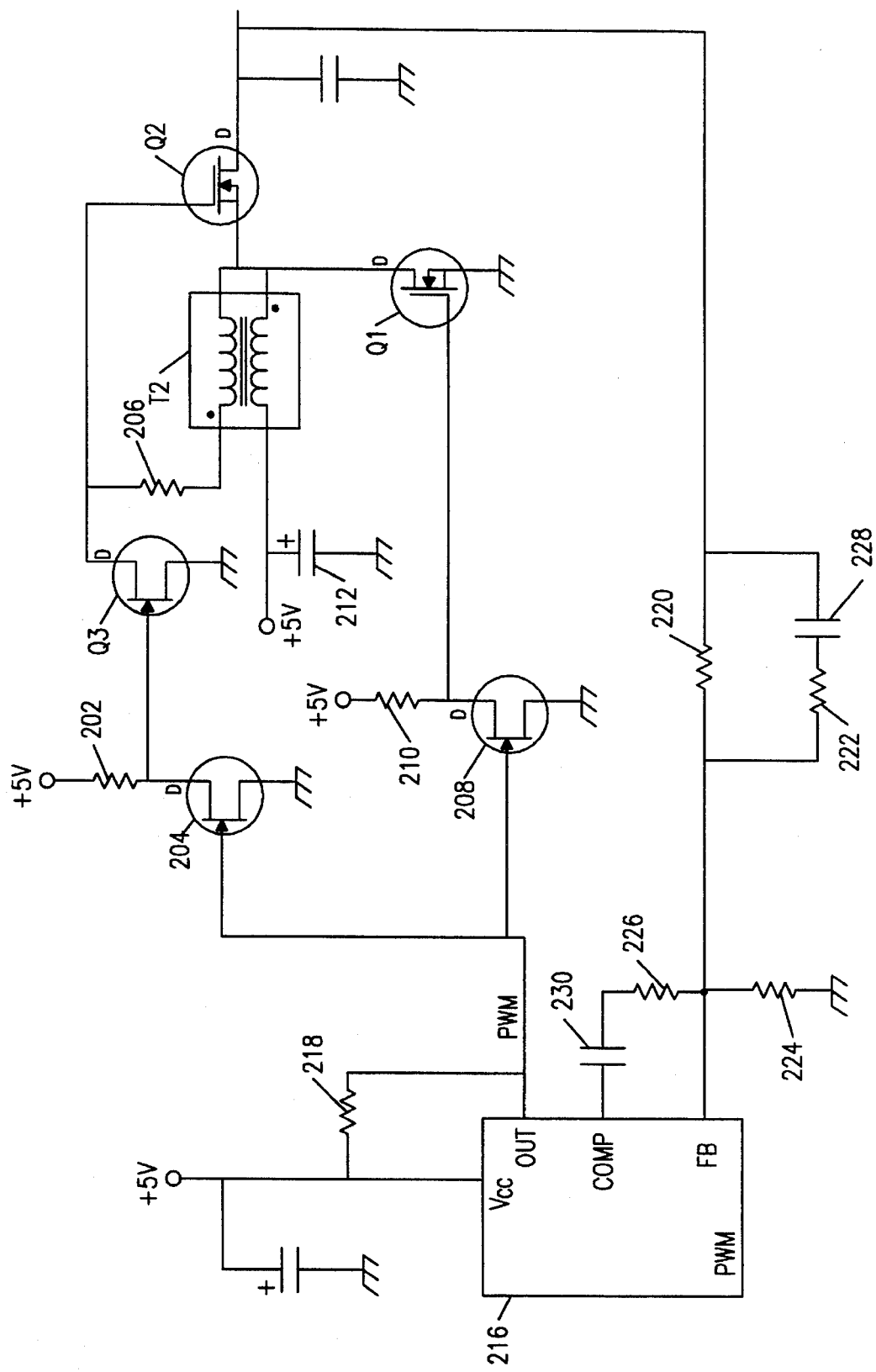
FIG. 2 is a schematic diagram of a boost regulator circuit according to the present invention.

Referring now to FIG. 2, a schematic diagram is shown of a boost regulator circuit 200 according to the present invention. A +5 V signal is provided to one end of resistor 202, having its other end connected to the drain of a double-diffused n-channel MOSFET 204. The MOSFET 204 has its source connected to ground and its gate receiving a signal PWM. The drain of the MOSFET 204 is connected to the gate of another double-diffused n-channel MOSFET Q3, having its source connected to ground and its drain connected to one end of a resistor 206 and to the gate of an n-channel enhancement MOSFET Q2. The other end of the resistor 206 is connected to the dotted terminal of a secondary inductor of a transformer T2, where the undotted terminal of the secondary inductor is connected to the source of an n-channel enhancement type MOSFET Q1. The MOS- FETs Q1, Q2 are preferably the 30N03L, although any suitably power MOSFET or comparable power switching device is contemplated. The source of MOSFET Q1 is connected to ground and its gate is connected to the drain of a double-diffused n-channel MOSFET 208, having its source connected to ground and its drain connected to one end of a pull-up resistor 210. The MOSFETS 204, 208 and Q3 are preferably the 2N7002, although any other suitable switching device could be used. The other end of the resistor 210 is connected to the +5 V signal, and the gate of the MOSFET 208 receives the PWM signal. The +5 V signal is coupled through a capacitor 212 to ground and to the undotted terminal of a primary inductor of the transformer T2, where the dotted terminal of the primary inductor is connected to the source of the MOSFET Q2. The primary and secondary inductors of the transformer T2 are magnetically or otherwise mutually coupled. The drain of the MOSFET Q2 provides an output voltage $V_{OUT}$, which is filtered by an electrolyte capacitor 214 to ground. $V_{OUT}$ for the boost regulator 200 is preferably regulated at approximately 11.25 volts.

The PWM signal is preferably a square-wave type signal asserted by a PWM circuit 216, which is preferably the TL5001 manufactured by Texas Instruments. The VCC input of the PWM 216 receives the +5 V signal and a resistor 218 is coupled between the +5 V signal and the output of the PWM 216. The resistor 218 serves as a feed forward resistor to initiate operation. $V_{OUT}$ is provided through a resistor/capacitor (RC) feedback circuit comprising resistors 220, 222, 224 and 226 and two capacitors 228 and 230 coupled to the feedback (FB) and compensation (COMP) inputs of the PWM 216 as shown. The resistors 220, 224 form a voltage divider for $V_{OUT}$ to provide feedback signal $V_{FB}$ to the FB input of the PWM 216.

Operation of the synchronous boost regulator 200 is as follows. The PWM signal is asserted low by the PWM 216 thereby turning off the MOSFETs 204, 208, so that the +5 V signal is provided through the resistors 202, 210 to turn on the MOSFETs Q3, Q1, respectively. When the MOSFET Q3 is turned on, it pulls the gate of the MOSFET Q2 to ground thereby turning it off. The MOSFET Q1 provides a current path to ground from the +5 V signal through the primary inductor of the transformer T2, which stores energy during the power cycle.

When the PWM signal is asserted high by the PWM 216, the MOSFETs 204, 208 are turned on thereby turning off the MOSFETs Q3 and Q1, respectively. When the MOSFET Q1 is turned off, the primary and secondary inductors of the transformer T2 reverse polarity causing flux reversal, where the flux reversal of the secondary inductor rams on the MOSFET Q2 through resistor 206. The MOSFET Q2 provides a current path from the +5 V signal through the primary inductor of the transformer T2 to $V_{OUT}$. The voltage across the primary inductor adds to the +5 V signal to boost the output voltage to approximately 11.25 volts. When the PWM signal is next pulled low, the MOSFETs 204, 208 are mined off thereby taming back on the MOSFETs Q3 and Q1, respectively, as described previously. The resistors 220 and 224 divide the voltage of $V_{OUT}$ to maintain the $V_{FB}$ signal at approximately 1 volt. For example, the resistor 220 is preferably 30K ohms and the resistor 224 is preferably 3K ohm thereby properly dividing $V_{OUT}$. The PWM 216 modifies the duty cycle of the PWM signal to regulate $V_{OUT}$ at 11.25 volts as desired. It is noted that if the transformer T1 tends to ring during flux reversal, a diode may optionally be inserted in series with the resistor 206 to prevent any oscillation of the MOSFET Q2. The cathode of the optional diode would be connected to the gate of the MOSFET Q2.

It is clear that the synchronous boost regulator circuit 200 shown in FIG. 2 obtains all the benefits of synchronous operation through the operation of the MOSFETs Q1 and Q2, and through the use of the secondary or sense inductor of the transformer T2. This allows the use of a relatively simple PWM circuit, such as the TL5001 as shown. Otherwise, the MOSFET Q2 would require a separate synchronized output of the PWM circuit, which in turn would require a more sophisticated and expensive dual output PWM circuit. The MOSFET Q3 assures that the MOSFET Q2 is mined off while the MOSFET Q1 is mined on during energy storage in the transformer T2.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A synchronous regulator circuit, comprising:
   a transformer having first and second magnetically coupled inductors, said first inductor for transferring power to an output of the synchronous regulator circuit;
   means for providing a DC source voltage;
   a first switch having a current path coupled to said first inductor and said DC source voltage providing means, said power switch having a control terminal;
   a second switch having a current path coupled to said first inductor and a control terminal coupled to said second inductor; and
   a timing circuit coupled to said first and second switches for turning on said first switch and turning off said second switch during a power phase and for turning off said first switch during a flux reversal phase of each cycle, wherein flux reversal of said second inductor turns on said second switch during said flux reversal phase of each cycle.

2. The synchronous regulator circuit of claim 1, wherein said timing circuit includes:
   a third switch coupled to said control terminal of said second switch for clamping said second switch off during said power phase.

3. The synchronous regulator circuit of claim 1, wherein said transformer and said first and second switches are coupled to implement a buck regulator.

4. The synchronous regulator circuit of claim 3, wherein said current path of said first switch is coupled in series between said DC source voltage providing means and said first inductor of said transformer, wherein said first inductor is coupled in series between said first switch and said output and said second inductor is coupled in series between said output and said control terminal of said second switch.

5. The synchronous regulator circuit of claim 4, wherein said current path of said second switch is coupled between ground and the junction of said first switch and said first inductor.

6. The synchronous regulator circuit of claim 3, wherein said timing circuit includes a timer for asserting a pulse width modulated signal to said control terminal of said first switch for turning on and off said first switch.

7. The synchronous regulator circuit of claim 6, wherein said timing circuit further includes a third switch coupled to said second switch and receiving said pulse width modulated signal, wherein said third switch turns off said second switch while said first switch is turned on.

8. The synchronous regulator circuit of claim 7, wherein said third switch is a MOSFET.

9. The synchronous regulator circuit of claim 6, wherein said timer is a 555-type timer.

10. The synchronous regulator circuit of claim 1, wherein said first and second switches are MOSFETs.

11. The synchronous regulator circuit of claim 10, wherein said feedback circuit includes a voltage divider and a shunt regulator.

12. The synchronous regulator circuit of claim 1, further comprising a feedback circuit coupled between said output of the synchronous regulator circuit and said timing circuit for sensing the output voltage.

13. The synchronous regulator circuit of claim 1, wherein said transformer and said first and second switches are coupled to implement a boost regulator.

14. The synchronous regulator circuit of claim 13, further comprising a feedback circuit coupled between said output of the synchronous regulator circuit and said timing circuit for sensing the output voltage.

15. The synchronous regulator circuit of claim 14, wherein said timing circuit includes a feedback input receiving a feedback signal from said feedback circuit for varying the duty cycle of a pulse width modulated signal provided by said timing circuit.

16. The synchronous regulator circuit of claim 13, wherein said timing circuit includes a third switch coupled to said second switch for turning off said second switch while said first switch is turned on.

17. The synchronous regulator circuit of claim 16, wherein said third switch is a MOSFET.

18. The synchronous regulator circuit of claim 16, wherein said timing circuit asserts a pulse width modulated signal and includes a fourth switch receiving said pulse width modulated signal for turning on and off said third switch.

19. The synchronous regulator circuit of claim 18, wherein said timing circuit includes a fifth switch receiving said pulse width modulated signal for turning on and off said first switch.

20. The synchronous regulator circuit of claim 1, wherein said current path of said first switch is coupled in series between said first inductor and ground, wherein said first inductor is coupled in series between said DC source voltage providing means and said first switch and wherein said current path of said second switch is coupled in series between said transformer and said output.

21. The synchronous regulator circuit of claim 20, wherein said second inductor is coupled between one end of said current path and said control terminal of said second switch.

22. A synchronous switching circuit for a regulator circuit including a pulse width modulation circuit for switching between power and flyback phases, a DC source voltage, a primary power inductor, a primary power switch controlled by the pulse width modulation for transferring power from the DC source voltage to the power inductor and a feedback circuit coupled between an output of the regulator circuit and the pulse width modulation circuit for defining the level of output voltage, said synchronous switching circuit comprising:

a secondary inductor for magnetically coupling to the power inductor; and a synchronous switch circuit for coupling to the pulse width modulation circuit and coupled to said secondary inductor;

wherein said synchronous switch circuit is turned off while the power switch is turned on and is turned on by said secondary inductor during flux reversal of the power inductor.

23. The synchronous switching circuit of claim 22, wherein said synchronous switch circuit comprises:

a first switch for coupling to the pulse width modulation circuit; and a second switch coupled to said first switch and said secondary inductor.

24. The synchronous switch circuit of claim 23, wherein said second switch comprises a MOSFET.

* * * * *